United States Patent
Kamiya (10) Patent No.: US 10,745,551 B2
(45) Date of Patent: Aug. 18, 2020

(54) LATENT CURING AGENT, PRODUCTION METHOD THEREFOR, AND THERMOSETTING EPOXY RESIN COMPOSITION

(71) Applicant: Dexerials Corporation, Shinagawa-ku, Tokyo (JP)

(72) Inventor: Kazunobu Kamiya, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 88 days.

(21) Appl. No.: 16/302,800

(22) PCT Filed: Jun. 6, 2017

(86) PCT No.: PCT/JP2017/020905
§ 371 (c)(1),
(2) Date: Nov. 19, 2018

(87) PCT Pub. No.: WO2017/217275
PCT Pub. Date: Dec. 21, 2017

(65) Prior Publication Data
US 2019/0177533 A1    Jun. 13, 2019

(30) Foreign Application Priority Data

Jun. 15, 2016   (JP) .................. 2016-119074

(51) Int. Cl.
| | | |
|---|---|---|
| *C08K 3/20* | (2006.01) | |
| *C08L 63/00* | (2006.01) | |
| *C08G 59/40* | (2006.01) | |
| *C08G 59/20* | (2006.01) | |
| *C08G 14/00* | (2006.01) | |
| *C08G 12/00* | (2006.01) | |
| *C08J 7/04* | (2020.01) | |

(52) U.S. Cl.
CPC ............. *C08L 63/00* (2013.01); *C08G 12/00* (2013.01); *C08G 14/00* (2013.01); *C08G 59/20* (2013.01); *C08G 59/40* (2013.01); *C08J 7/042* (2013.01); *C08J 2375/02* (2013.01); *C08J 2463/00* (2013.01); *C08L 2205/02* (2013.01); *C08L 2205/03* (2013.01); *C08L 2207/53* (2013.01)

(58) Field of Classification Search
CPC ......... C08L 63/00; C08G 12/00; C08G 14/00; C08G 59/20; C08G 59/40; C08G 59/245; C08G 59/70; C08G 18/222; C08J 7/042; C08K 5/5415
USPC ....................................................... 523/201
See application file for complete search history.

(56) References Cited

U.S. PATENT DOCUMENTS

| | | | | |
|---|---|---|---|---|
| 10,093,760 B2* | 10/2018 | Lee | ........................ | C08F 2/24 |
| 10,626,215 B2* | 4/2020 | Kamiya | ................ | C08G 59/24 |
| 10,669,458 B2* | 6/2020 | Kamiya | ............ | C08G 18/0866 |
| 2009/0230360 A1 | 9/2009 | Komuro et al. | | |
| 2010/0324170 A1 | 12/2010 | Kamiya | | |
| 2010/0331435 A1 | 12/2010 | Kamiya | | |
| 2011/0196110 A1* | 8/2011 | Kamiya | ................ | C08G 59/70 |
| | | | | 525/454 |
| 2012/0119156 A1 | 5/2012 | Kamiya | | |
| 2017/0253694 A1 | 9/2017 | Kamiya | | |
| 2018/0371155 A1* | 12/2018 | Kamiya | ................ | C08G 59/24 |
| 2019/0203087 A1* | 7/2019 | Kamiya | ................ | C08G 18/00 |

FOREIGN PATENT DOCUMENTS

| | | |
|---|---|---|
| JP | 2009-51960 | 3/2009 |
| JP | 2010168449 | 8/2010 |
| JP | 2012-188596 | 10/2012 |
| JP | 2014-015631 | 1/2014 |
| JP | 5481013 | 2/2014 |
| JP | 5481995 | 2/2014 |
| JP | 5664366 | 12/2014 |
| WO | 2007/091358 | 8/2007 |
| WO | 2008/090792 | 7/2008 |
| WO | 2012/002177 | 1/2012 |
| WO | 2016039193 | 3/2016 |

OTHER PUBLICATIONS

Japanese Office Action dated Oct. 29, 2019 issued in corresponding Japanese Patent Application No. 2016-119074.

* cited by examiner

*Primary Examiner* — Hannah J Pak
(74) *Attorney, Agent, or Firm* — Carmody Torrance Sandak & Hennessey LLP (57) ABSTRACT

Provided is a latent curing agent, including: porous particles formed of a polyurea resin and supporting an aluminum chelate and an aryl silanol compound; and a coating film over the surface of the porous particles, the coating film being formed of a cured product of an alicyclic epoxy resin.

9 Claims, 2 Drawing Sheets

LATENT CURING AGENT, PRODUCTION METHOD THEREFOR, AND THERMOSETTING EPOXY RESIN COMPOSITION

TECHNICAL FIELD

The present invention relates to a latent curing agent and a method for producing the same, and a thermosetting epoxy resin composition.

BACKGROUND ART

Hitherto, as curing agents that exhibit a low-temperature fast-curing activity with respect to epoxy resins, there have been proposed aluminum chelate-based latent curing agents in which porous resins obtained by interfacial polymerization of multifunctional isocyanate compounds support aluminum chelate-based curing agents (for example, see PTLs 1 to 3).

However, there is a problem that thermosetting epoxy resin compositions containing the latent curing agents of the proposed techniques tend to undergo viscosity rise during storage.

When the proposed techniques are employed, an attempt to suppress viscosity rise during storage results in degradation of low-temperature curability.

Hence, under the current circumstances, a latent curing agent that can satisfy both of a low-temperature curing ability and suppression of viscosity rise of thermosetting epoxy resin compositions during storage is demanded.

CITATION LIST

Patent Literature

PTL 1: Japanese Patent (JP-B) No. 5481995
PTL 2: JP-B No. 5481013
PTL 3: JP-B No. 5664366

SUMMARY OF INVENTION

Technical Problem

The present invention aims for solving the various problems in the related art and achieving an object described below. That is, the present invention has an object to provide a latent curing agent that can satisfy both of a low-temperature curing ability and suppression of viscosity rise of thermosetting epoxy resin compositions during storage and a method for producing the same, and a thermosetting epoxy resin composition containing the latent curing agent.

Solution to Problem

Means for solving the above problems are as follows.
<1> A latent curing agent, including:
  porous particles formed of a polyurea resin and supporting an aluminum chelate and an aryl silanol compound; and
  a coating film over a surface of the porous particles, the coating film being formed of a cured product of an alicyclic epoxy resin.
<2> The latent curing agent according to <1>,
  wherein the coating film contains the alicyclic epoxy resin.
<3> The latent curing agent according to <1> or <2>,
  wherein the alicyclic epoxy resin contains at least any one of compounds represented by structural formulae below, <4> A method for producing a latent curing agent, the method including:
  a porous particle producing step of obtaining an emulsified liquid through emulsification of a liquid in which an aluminum chelate, an aryl silane compound, and a multifunctional isocyanate compound are mixed, and subsequently polymerizing the multifunctional isocyanate compound in the emulsified liquid, to obtain porous particles supporting the aluminum chelate and the aryl silane compound or an aryl silanol compound, which is a hydrolysate of the aryl silane compound; and
  a coating step of coating a surface of the porous particles with a coating film formed of a cured product of an alicyclic epoxy resin.
<5> The method for producing a latent curing agent according to <4>,
  wherein the coating step is performed by immersing the porous particles in a solution containing the alicyclic epoxy resin and an organic solvent and curing the alicyclic epoxy resin.
<6> The method for producing a latent curing agent according to <5>,
  wherein a content of the alicyclic epoxy resin in the solution is from 50% by mass through 70% by mass.
<7> A thermosetting epoxy resin composition, including:
  the latent curing agent according to any one of <1> to <3>; and
  an epoxy resin.
<8> The thermosetting epoxy resin composition according to <7>, further including:
  an aryl silanol compound.
<9> The thermosetting epoxy resin composition according to <7> or <8>,
  wherein the epoxy resin contains an alicyclic epoxy resin.

Advantageous Effects of Invention

The present invention can solve the various problems in the related art, achieve the object described above, and provide a latent curing agent that can satisfy both of a low-temperature curing ability and suppression of viscosity rise of thermosetting epoxy resin compositions during storage and a method for producing the same, and a thermosetting epoxy resin composition containing the latent curing agent.

DESCRIPTION OF EMBODIMENTS (Latent Curing Agent)

A latent curing agent of the present invention contains at least porous particles and a coating film, and further contains other members as needed.

<Porous Particles>

The porous particles are formed of at least a polyurea resin, and may further contain a vinyl resin as a constituent component.

The porous particles support an aluminum chelate and an aryl silanol compound.

For example, the porous particles support the aluminum chelate and the aryl silanol compound in the pores thereof. In other words, the aluminum chelate and the aryl silanol compound are supported by being taken into the fine pores present in the porous particle matrix formed of the polyurea resin.

<<Polyurea Resin>>

The polyurea resin is a resin that contains a urea bond in the resin.

The polyurea resin constituting the porous particles is obtained by, for example, polymerizing a multifunctional isocyanate compound in an emulsified liquid. The details will be described below. The polyurea resin may contain a bond that is derived from an isocyanate group and is other than a urea bond, such as a urethane bond in the resin.

<<Vinyl Resin>>

The vinyl resin is a resin obtained by polymerizing a radical polymerizable vinyl compound.

The vinyl resin improves the mechanical properties of the porous particles. This can realize thermal responsiveness of an epoxy resin in a thermosetting epoxy resin composition during curing, particularly, a sharp thermal responsiveness in a low-temperature region.

The vinyl resin can be obtained by, for example, making the radical polymerizable vinyl compound co-present in the emulsified liquid containing the multifunctional isocyanate compound, and radical-polymerizing the radical polymerizable vinyl compound at the same time as polymerizing the multifunctional isocyanate compound in the emulsified liquid.

<<Aluminum Chelate>>

Examples of the aluminum chelate include a complex compound that is represented by general formula (1) below and in which three β-ketoenolate anions are coordinated to aluminum. Here, alkoxy groups are not directly bonded to aluminum. If they are directly bonded, they tend to be hydrolyzed, which is not suitable for emulsification.

General formula (1)

In general formula (1), $R^1$, $R^2$ and $R^3$ each independently represent an alkyl group or an alkoxyl group.

Examples of the alkyl group include a methyl group and an ethyl group.

Examples of the alkoxyl group include a methoxy group, an ethoxy group, and an oleyloxy group.

Examples of the complex compound represented by general formula (1) include aluminum tris(acetyl acetonate), aluminum tris(ethyl acetoacetate), aluminum monoacetyl acetonate bis(ethyl acetate), and aluminum monoacetyl acetonate bis(oleyl acetoacetate).

The content of the aluminum chelate in the porous particles is not particularly limited and may be appropriately selected depending on the intended purpose.

<Aryl Silanol Compound>

For example, the aryl silanol compound is represented by general formula (A) below.

$$(Ar)_m Si(OH)_n \qquad \text{General formula (A)}$$

In general formula (A), m is 2 or 3 and preferably 3, the sum of m and n is 4, and Ar is an aryl group that may contain a substituent.

The aryl silanol compound represented by general formula (A) is a monool form or a diol form.

Ar in general formula (A) is an aryl group that may contain a substituent.

Examples of the aryl group include a phenyl group, a naphthyl group (e.g., 1-naphthyl group and 2-naphthyl group), an anthracenyl group (e.g., 1-anthracenyl group, 2-anthracenyl group, 9-anthracenyl group, and benz[a]-9-anthracenyl group), a phenaryl group (e.g., 3-phenaryl group and 9-phenaryl group), a pyrenyl group (e.g., 1-pyrenyl group), an azulenyl group, a fluorenyl group, a biphenyl group (e.g., 2-biphenyl group, 3-biphenyl group, and 4-biphenyl group), a thienyl group, a furyl group, a pyrrolyl group, an imidazolyl group, and a pyridyl group. Among these aryl groups, a phenyl group is preferable in terms of ease of procurement and costs for procurement. The m number of Ar may be the same as or different from each other, but preferably are the same as each other in terms of ease of procurement.

For example, these aryl groups may contain one through three substituents.

Examples of the substituent include an electron withdrawing group and an electron donating group.

Examples of the electron withdrawing group include a halogen group (e.g., chloro group and bromo group), a trifluoromethyl group, a nitro group, a sulfo group, a carboxyl group, an alkoxycarbonyl group (e.g., methoxycarbonyl group and ethoxycarbonyl group), and a formyl group.

Examples of the electron donating group include an alkyl group (e.g., methyl group, ethyl group, and propyl group), an alkoxy group (e.g., methoxy group and ethoxy group), hydroxy group, amino group, monoalkyl amino group (e.g., monomethyl amino group), and a dialkyl amino group (e.g., dimethyl amino group).

Specific examples of a phenyl group containing a substituent include 2-methylphenyl group, 3-methylphenyl group, 4-methylphenyl group, 2,6-dimethylphenyl group, 3,5-dimethylphenyl group, 2,4-dimethylphenyl group, 2,3-dimethylphenyl group, 2,5-dimethylphenyl group, 3,4-dimethylphenyl group, 2,4,6-trimethylphenyl group, 2-ethylphenyl group, and 4-ethylphenyl group.

Use of an electron withdrawing group as a substituent makes it possible to increase the acidity of a hydroxyl group of a silanol group. Use of an electron donating group as a substituent makes it possible to decrease the acidity of a hydroxyl group of a silanol group. Therefore, with the substituent, it is possible to control the curing activity.

Here, the m number of Ar may contain different substituents, but preferably contain the same substituent in terms of ease of procurement of the m number of Ar. Moreover, some Ar may contain a substituent and the other Ar need not contain a substituent.

Among these, triphenyl silanol and diphenyl silanediol are preferable, and triphenyl silanol is particularly preferable.

The content of the aryl silanol compound in the porous particles is not particularly limited and may be appropriately selected depending on the intended purpose.

The average pore diameter of the pores of the porous particles is not particularly limited, may be appropriately selected depending on the intended purpose, and is preferably from 1 nm through 300 nm and more preferably from 5 nm through 150 nm.

In the present specification, the numerical range defined using the term "through" is a range including the lower limit value and the upper limit value. That is, "from 1 nm through 300 nm" has the same meaning as "1 nm or greater but 300 nm or less".

<Coating Film>

The coating film is formed of a cured product of an alicyclic epoxy resin.

The coating film is formed over the surface of the porous particles.

It is preferable that the coating film contain the alicyclic epoxy resin. That is, it is preferable that the coating film be formed of a cured product obtained by curing an alicyclic epoxy resin and additionally contain the alicyclic epoxy resin, which is an unreacted substance in the curing.

The porous particles themselves function as a latent curing agent having a low-temperature curing ability. However, when the porous particles are used as a latent curing agent in a thermosetting epoxy resin composition, the thermosetting epoxy resin composition tends to undergo viscosity rise during storage. Particularly, viscosity rise is considerable when an alicyclic epoxy resin excellent in cationic polymerizability is used as the epoxy resin in the thermosetting epoxy resin composition.

On the other hand, because of having the coating film formed of the cured product of the alicyclic epoxy resin over the surface of the porous particles, the latent curing agent of the present invention, when used in a thermosetting epoxy resin composition, can suppress viscosity rise of the thermosetting epoxy resin composition during storage. Also in this case, the latent curing agent of the present invention is excellent in a low-temperature curing ability.

<<Alicyclic Epoxy Resin>>

The alicyclic epoxy resin is not particularly limited and may be appropriately selected depending on the intended purpose. Examples of the alicyclic epoxy resin include vinyl cyclopentadiene dioxide, vinyl cyclohexene mono- or dioxide, dicyclopentadiene oxide, epoxy-[epoxy-oxaspiro $C_{8-15}$ alkyl]-cyclo $C_{5-12}$ alkane (e.g., 3,4-epoxy-1-[8,9-epoxy-2,4-dioxaspiro[5.5]undecan-3-yl]-cyclohexane), 3,4-epoxycyclohexylmethyl-3',4'-epoxycyclohexane carborate, epoxy $C_{5-12}$ cycloalkyl $C_{1-3}$ alkyl-epoxy $C_{5-12}$ cycloalkane carboxylate (e.g., 4,5-epoxycyclooctylmethyl-4',5'-epoxycyclooctane carboxylate), and bis($C_{1-3}$ alkyl epoxy $C_{5-12}$ cycloalkyl $C_{1-3}$ alkyl)dicarboxylate (e.g., bis(2-methyl-3,4-epoxycyclohexylmethyl)adipate).

As the alicyclic epoxy resin, 3,4-epoxycyclohexylmethyl-3',4'-epoxycyclohexane carboxylate is suitable for use in terms of ease of procurement as a commercially available product [available from Daicel Corporation, product name: CELLOXIDE #2021P; with an epoxy equivalent of from 128 through 140].

In the examples raised above, the descriptions $C_{8-15}$, $C_{5-12}$, and $C_{1-3}$ stand for a number of carbon atoms of from 8 through 15, a number of carbon atoms of from 5 through 12, and a number of carbon atoms of from 1 through 3, respectively, and suggest structural variations of the compounds.

The structural formula of an example of the alicyclic epoxy resin is presented below.

It is preferable that the alicyclic epoxy resin be free of a hydrolysable group. Examples of the hydrolysable group include an alkoxysilyl group.

It is preferable that the latent curing agent be in the form of particles.

The average particle diameter of the latent curing agent is not particularly limited, may be appropriately selected depending on the intended purpose, and is preferably from 0.5 micrometers through 20 micrometers, more preferably from 1 micrometer through 10 micrometers, and particularly preferably from 1 micrometer through 5 micrometers.

(Method for Producing Latent Curing Agent)

A method for producing the latent curing agent includes at least a porous particle producing step and a coating step, and further includes other steps as needed.

<Porous Particle Producing Step>

The porous particle producing step includes at least an emulsified liquid producing process and a polymerization process, preferably includes an additionally filling process, and further includes other processes as needed.

<<Emulsified Liquid Producing Process>>

The emulsified liquid producing process is not particularly limited and may be appropriately selected depending on the intended purpose so long as the emulsified liquid producing process is a process of emulsifying a liquid in which an aluminum chelate, an aryl silane compound, a multifunctional isocyanate compound, and preferably an organic solvent are mixed, to obtain an emulsified liquid. The emulsified liquid producing process can be performed with, for example, a homogenizer.

When there are not only a polyurea resin but also a vinyl resin as the resins for constituting the porous particles, the liquid further contains a radical polymerizable vinyl compound and a radical polymerization initiator.

Examples of the aluminum chelate include the aluminum chelate mentioned in the description about the latent curing agent of the present invention.

The size of oil droplets in the emulsified liquid is not particularly limited, may be appropriately selected depending on the intended purpose, and is preferably from 0.5 micrometers through 100 micrometers.

—Aryl Silane Compound—

For example, the aryl silane compound is represented by general formula (B) below.

(Ar)mSi(OR)n            General formula (B)

In general formula (B), m is 2 or 3 and preferably 3, the sum of m and n is 4, Ar is an aryl group that may contain a substituent, R is a hydrogen atom, a methyl group, or an ethyl group, and when n is 2, the two R may be the same as or different from each other.

When R is a hydrogen atom, the aryl silane compound represented by general formula (B) is the aryl silanol compound. When R is a methyl group or an ethyl group, the aryl silane compound represented by general formula (B) becomes an aryl silanol compound as a result of the OR group being hydrolyzed to an OH group during emulsification or polymerization.

Specific examples of the aryl group as Ar that may contain a substituent include the aryl group as Ar that may contain a substituent mentioned in the description about the latent curing agent of the present invention. A preferable mode is also the same.

The blending amount of the aryl silane compound is not particularly limited, may be appropriately selected depending on the intended purpose, and is preferably from 1 part by mass through 500 parts by mass and more preferably from 1 part by mass through 300 parts by mass relative to 100 parts by mass of the aluminum chelate.

—Multifunctional Isocyanate Compound—

The multifunctional isocyanate compound is a compound that contains two or more isocyanate groups, preferably three isocyanate groups in a molecule. More preferable examples of such a trifunctional isocyanate compound include a TMP adduct form represented by general formula (2) below and obtained by allowing 1 mole of trimethylolpropane and 3 moles of a diisocyanate compound to undergo reaction, an isocyanurate form represented by general formula (3) below and obtained by allowing 3 moles of a diisocyanate compound to undergo self-condensation, and a biuret form represented by general formula (4) below and obtained as a result of diisocyanate urea obtained from 2 moles out of 3 moles of a diisocyanate compound undergoing condensation with the remaining 1 mole of diisocyanate.

General formula (2)

General formula (3)

General formula (4)

In general formulae (2) to (4), a substituent R is a moiety of the diisocyanate compound excluding an isocyanate group. Specific examples of such a diisocyanate compound include toluene 2,4-diisocyanate, toluene 2,6-diisocyanate, m-xylylene diisocyanate, hexamethylene diisocyanate, hexahydro-m-xylylene diisocyanate, isophorone diisocyanate, and methylene diphenyl-4,4'-diisocyanate.

The blending ratio between the aluminum chelate and the multifunctional isocyanate compound is not particularly limited and may be appropriately selected depending on the intended purpose. When the blending amount of the aluminum chelate is extremely low, a curing ability for an epoxy resin to be cured is low. When the blending amount of the aluminum chelate is extremely high, the latency of the latent curing agent to be obtained is low. In these regards, the ratio of the aluminum chelate with respect to 100 parts by mass of the multifunctional isocyanate compound is preferably from 10 parts by mass through 500 parts by mass and more preferably from 10 parts by mass through 300 parts by mass.

—Organic Solvent—

The organic solvent is not particularly limited and may be appropriately selected depending on the intended purpose. A volatile organic solvent is preferable.

It is preferable that the organic solvent be a good solvent for each of the aluminum chelate, the aryl silane compound, the multifunctional isocyanate compound, the multifunctional radical polymerizable vinyl compound, and the radical polymerization initiator (each having a solubility of preferably 0.1 g/ml (organic solvent) or greater), be substantially insoluble to water (water having a solubility of 0.5 g/ml (organic solvent) or less), and have a boiling point of 100 degrees C. or lower at the atmospheric pressure. Specific examples of such a volatile organic solvent include alcohols, acetic acid esters, and ketones. Among these volatile organic solvents, ethyl acetate is preferable in terms of a high polarity, a low boiling point, and a poor water-solubility.

The amount of the organic solvent to be used is not particularly limited and may be appropriately selected depending on the intended purpose.

—Radical Polymerizable Vinyl Compound—

The radical polymerizable vinyl compound is a compound that contains a radical polymerizable carbon-carbon unsaturated bond in a molecule.

The radical polymerizable vinyl compound encompasses a so-called monofunctional radical polymerizable compound and a multifunctional radical polymerizable compound.

It is preferable that the radical polymerizable vinyl compound contain a multifunctional radical polymerizable compound. This is because use of a multifunctional radical polymerizable compound makes it easier to realize a sharp thermal responsiveness in a low-temperature region. Also in this regard, it is preferable that the radical polymerizable vinyl compound contain a multifunctional radical polymerizable compound in an amount of 30% by mass or greater and more preferably 50% by mass or greater.

Examples of the monofunctional radical polymerizable compound include a monofunctional vinyl-based compound (e.g., styrene and methyl styrene) and a monofunctional (meth)acrylate-based compound (e.g., butyl acrylate).

Examples of the multifunctional radical polymerizable compound include a multifunctional vinyl-based compound (e.g., divinyl benzene and divinyl adipate) and a multifunctional (meth)acrylate-based compound (e.g., 1,6-hexanediol diacrylate and trimethylolpropane triacrylate).

Among these radical polymerizable vinyl compounds, a multifunctional vinyl-based compound, particularly, divinyl benzene can be suitably used in terms of latency and thermal responsiveness.

The multifunctional radical polymerizable compound may be formed of a multifunctional vinyl-based compound and a multifunctional (meth)acrylate-based compound. Such a combined use makes it possible to obtain an effect of varying thermal responsiveness or introducing a reactive functional group.

The blending amount of the radical polymerizable vinyl compound is not particularly limited, may be appropriately selected depending on the intended purpose, and is preferably from 1 part by mass through 80 parts by mass and more preferably from 10 parts by mass through 60 parts by mass relative to 100 parts by mass of the multifunctional isocyanate compound.

—Radical Polymerization Initiator—

Examples of the radical polymerization initiator include a peroxide-based initiator and an azo-based initiator.

The blending amount of the radical polymerization initiator is not particularly limited, may be appropriately selected depending on the intended purpose, and is preferably from 0.1 parts by mass through 10 parts by mass and more preferably from 0.5 parts by mass through 5 parts by mass relative to 100 parts by mass of the radical polymerizable vinyl compound.

<<Polymerization Process>>

The polymerization process is not particularly limited and may be appropriately selected depending on the intended purpose so long as the polymerization process is a process of polymerizing the multifunctional isocyanate compound in the emulsified liquid to obtain porous particles.

The porous particles support the aluminum chelate and the aryl silane compound or an aryl silanol compound, which is a hydrolysate of the aryl silane compound.

In the polymerization process, some isocyanate groups of the multifunctional isocyanate compound are hydrolyzed to amino groups, and these amino groups react with isocyanate groups of the multifunctional isocyanate compound to produce urea bonds, to obtain a polyurea resin. Here, when the multifunctional isocyanate compound contains a urethane bond, the polyurea resin to be obtained also contains a urethane bond. In this regard, the polyurea resin to be produced can also be referred to as polyurea urethane resin.

When the emulsified liquid contains the radical polymerizable vinyl compound and the radical polymerization initiator, in the polymerization process, the radical polymerizable vinyl compound undergoes radical polymerization in the presence of the radical polymerization initiator at the same time as the multifunctional isocyanate compound is polymerized.

As a result, the porous particles to be obtained contain a polyurea resin and a vinyl resin as the constituent resins.

The polymerization time in the polymerization process is not particularly limited, may be appropriately selected depending on the intended purpose, and is preferably from 1 hour through 30 hours and more preferably from 2 hours through 10 hours.

The polymerization temperature in the polymerization process is not particularly limited, may be appropriately selected depending on the intended purpose, and is preferably from 30 degrees C. through 90 degrees C. and more preferably from 50 degrees C. through 80 degrees C.

<<Additionally Filling Process>>

The additionally filling process is not particularly limited and may be appropriately selected depending on the intended purpose so long as the additionally filling process is a process of additionally filling an aluminum chelate to the porous particles obtained through the polymerization process. Examples of the method for the additionally filling process include a method of immersing the porous particles in a solution obtained by dissolving an aluminum chelate in an organic solvent and subsequently removing the organic solvent from the solution.

Through the additionally filling process, the amount of aluminum chelate to be supported on the porous particles increases. The porous particles to which an aluminum chelate is additionally filled may be filtrated, washed, and dried as needed, and subsequently pulverized to primary particles with a known pulverizer.

The aluminum chelate to be additionally filled in the additionally filling process may be the same as or different from the aluminum chelate blended in the liquid, which is to become the emulsified liquid. For example, because no water is used in the additionally filling process, the aluminum chelate used in the additionally filling process may be an aluminum chelate in which alkoxy groups are bonded to aluminum. Examples of such an aluminum chelate include diisopropoxyaluminum monooleyl acetoacetate, monoisopropoxyaluminum bis(oleyl acetoacetate), monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacetate, and monoisopropoxyaluminum mono-N-lauroyl-β-alanate monolauryl acetoacetate.

The organic solvent is not particularly limited and may be appropriately selected depending on the intended purpose. Examples of the organic solvent include the organic solvents raised as examples in the description about the emulsified liquid producing process. A preferable mode is also the same.

The method for removing the organic solvent from the solution is not particularly limited and may be appropriately selected depending on the intended purpose. Examples of the method include a method of heating the solution to higher than or equal to the boiling point of the organic solvent and a method of depressurizing the solution.

The content of the aluminum chelate in the solution obtained by dissolving the aluminum chelate in the organic solvent is not particularly limited, may be appropriately selected depending on the intended purpose, and is preferably from 10% by mass through 80% by mass and more preferably from 10% by mass through 50% by mass.

<Coating Step>

The coating step is not particularly limited and may be appropriately selected depending on the intended purpose so long as the coating step is a step of coating the surface of the porous particles with a coating film formed of a cured product of an alicyclic epoxy resin. It is preferable to perform the coating step by immersing the porous particles in a solution containing the alicyclic epoxy resin and an organic solvent and curing the alicyclic epoxy resin.

In curing of the alicyclic epoxy resin in the coating step, the aluminum chelate and the aryl silanol compound that are supported on the porous particles are considered to serve as a curing aid.

In the coating step, use of an alicyclic epoxy resin excellent in cationic polymerizability enables formation of a coating film under mild conditions. On the other hand, use of a non-alicyclic epoxy resin (e.g., so-called glycidyl ether-type epoxy resin) instead of the alicyclic epoxy resin requires a high temperature for producing a coating film. In this case, troubles tend to occur, such as aggregation of the porous particles and outflow of the aluminum chelate and the aryl silanol compound from the porous particles.

<<Alicyclic Epoxy Resin>>

The alicyclic epoxy resin is not particularly limited and may be appropriately selected depending on the intended purpose. Examples of the alicyclic epoxy resin include the alicyclic epoxy resins raised as examples in the description about the latent curing agent of the present invention.

<<Organic Solvent>>

The organic solvent is not particularly limited, may be appropriately selected depending on the intended purpose, and is preferably a nonpolar solvent. Examples of the nonpolar solvent include a hydrocarbon-based solvent. Examples of the hydrocarbon-based solvent include toluene, xylene, and cyclohexane.

The content of the alicyclic epoxy resin in the solution is not particularly limited, may be appropriately selected depending on the intended purpose, and is preferably from 40% by mass through 80% by mass, more preferably from 50% by mass through 70% by mass, and particularly preferably from 55% by mass through 65% by mass because the latent curing agent to be obtained is better in a low-temperature curing ability and suppression of viscosity rise of thermosetting epoxy resin compositions.

The temperature of the solution in the coating step is not particularly limited, may be appropriately selected depending on the intended purpose, and is preferably from 20 degrees C. through 60 degrees C. and more preferably from 20 degrees C. through 40 degrees C. in terms of preventing aggregation of the porous particles and outflow of the aluminum chelate and the aryl silanol compound from the porous particles.

The immersion time in the coating step is not particularly limited, may be appropriately selected depending on the intended purpose, and is preferably from 2 hours through 48 hours and more preferably from 5 hours through 30 hours.

In the coating step, it is preferably to stir the solution.

The latent curing agent obtained through the coating step may be filtrated, washed, and dried as needed, and subsequently pulverized to primary particles with a known pulverizer.

(Thermosetting Epoxy Resin Composition)

A thermosetting epoxy resin composition of the present invention contains at least the latent curing agent of the present invention and an epoxy resin, preferably contains an aryl silanol compound, and further contains other components as needed.

<Latent Curing Agent>

The latent curing agent contained in the thermosetting epoxy resin composition is the latent curing agent of the present invention.

The content of the latent curing agent in the thermosetting epoxy resin composition is not particularly limited, may be appropriately selected depending on the intended purpose, and is preferably from 1 part by mass through 70 parts by mass and more preferably from 1 part by mass through 50 parts by mass relative to 100 parts by mass of the epoxy resin. When the content of the latent curing agent is less than 1 part by mass, curability may be poor. When the content of the latent curing agent is greater than 70 parts by mass, resin properties (e.g., flexibility) of a cured product may be poor.

<Epoxy Resin>

The epoxy resin is not particularly limited and may be appropriately selected depending on the intended purpose. Examples of the epoxy resin include a glycidyl ether-type epoxy resin and an alicyclic epoxy resin.

For example, the glycidyl ether-type epoxy resin may be liquid or solid, and typically has an epoxy equivalent of about from 100 through 4,000. A glycidyl ether-type epoxy resin that contains two or more epoxy groups in a molecule is preferable. Examples of such a glycidyl ether-type epoxy resin include a bisphenol A-type epoxy resin, a bisphenol F-type epoxy resin, a phenol novolac-type epoxy resin, a cresol novolac-type epoxy resin, and an ester-type epoxy resin. Among these glycidyl ether-type epoxy resins, a bisphenol A-type epoxy resin can be suitably used in terms of resin properties. These epoxy resins encompass monomers and oligomers.

The alicyclic epoxy resin is not particularly limited and may be appropriately selected depending on the intended purpose. Examples of the alicyclic epoxy resin include vinyl cyclopentadiene dioxide, vinyl cyclohexene mono- or di-oxide, dicyclopentadiene oxide, epoxy-[epoxy-oxaspiro $C_{8-15}$ alkyl]-cyclo $C_{5-12}$ alkane (e.g., 3,4-epoxy-1-[8,9-epoxy-2,4-dioxaspiro[5.5]undecan-3-yl]-cyclohexane), 3,4-epoxycyclohexylmethyl-3',4'-epoxycyclohexane carborate, epoxy $C_{5-12}$ cycloalkyl $C_{1-3}$ alkyl-epoxy $C_{5-12}$ cycloalkane carboxylate (e.g., 4,5-epoxycyclooctylmethyl-4',5'-epoxycyclooctane carboxylate), and bis($C_{1-3}$ alkyl epoxy $C_{5-12}$ cycloalkyl $C_{1-3}$ alkyl)dicarboxylate (e.g., bis(2-methyl-3,4-epoxycyclohexylmethyl)adipate).

As the alicyclic epoxy resin, 3,4-epoxycyclohexylmethyl-3',4'-epoxycyclohexane carboxylate is suitable for use in terms of ease of procurement as a commercially available product [available from Daicel Corporation, product name: CELLOXIDE #2021P; with an epoxy equivalent of from 128 through 140].

In the examples raised above, the descriptions $C_{8-15}$, $C_{5-12}$, and $C_{1-3}$ stand for a number of carbon atoms of from 8 through 15, a number of carbon atoms of from 5 through 12, and a number of carbon atoms of from 1 through 3, respectively, and suggest structural variations of the compounds.

The structural formula of an example of the alicyclic epoxy resin is presented below.

<Aryl Silanol Compound>

Examples of the aryl silanol compound include the aryl silanol compounds raised as examples in the description about the latent curing agent of the present invention. A preferable mode is also the same.

<Other Components>

The other components are not particularly limited and may be appropriately selected depending on the intended purpose. Examples of the other components include an aryl silane compound, an oxetane compound, a silane coupling agent, a filler, a pigment, and an antistat.

<<Oxetane Compound>>

Combined use of the oxetane compound with the epoxy resin in the thermosetting epoxy resin composition enables a sharp exothermic peak.

Examples of the oxetane compound include 3-ethyl-3-hydroxymethyl oxetane, 1,4-bis{[(3-ethyl-3-oxetanyl) methoxy]methyl}benzene, 4,4'-bis[(3-ethyl-3-oxetanyl) methoxymethyl]biphenyl, 1,4-benzene dicarboxylic acid bis [(3-ethyl-3-oxetanyl)]methyl ester, 3-ethyl-3-(phenoxymethyl)oxetane, 3-ethyl-3-(2-ethylhexyloxymethyl)oxetane, di[1-ethyl(3-oxetanyl)] methyl ether, 3-ethyl-3-{[3-(triethoxysilyl)propoxy] methyl}oxetane, oxetanyl silsesquioxane, and phenol novolac oxetane.

The content of the oxetane compound in the thermosetting epoxy resin composition is not particularly limited, may be appropriately selected depending on the intended purpose, and is preferably from 10 parts by mass through 100 parts by mass and more preferably from 20 parts by mass through 70 parts by mass relative to 100 parts by mass of the epoxy resin.

<<Silane Coupling Agent>>

As described in paragraphs 0007 to 0010 of Japanese Patent Application Laid-Open (JP-A) No. 2002-212537, the silane coupling agent has a function of working in cooperation with an aluminum chelate agent to initiate cationic polymerization of a thermosetting resin (e.g., a thermosetting epoxy resin). Hence, combined use of such a silane coupling agent in a small amount can provide an effect of promoting curing of an epoxy resin. Such a silane coupling agent contains one through three lower alkoxy groups in a molecule, and may contain a group having reactivity with a functional group of a thermosetting resin in a molecule, such as a vinyl group, a styryl group, an acryloyloxy group, a methacryloyloxy group, an epoxy group, an amino group, and a mercapto group. Because the latent curing agent of the present invention is a cationic curing agent, a coupling agent containing an amino group or a mercapto group may be used so long as the amino group or the mercapto group does not substantially trap cationic species generated.

Examples of the silane coupling agent include vinyl tris(β-methoxyethoxy)silane, vinyl triethoxysilane, vinyl trimethoxysilane, γ-styryl trimethoxysilane, γ-methacryloxypropyl trimethoxysilane, γ-acryloxypropyl trimethoxysilane, β-(3,4-epoxycyclohexyl)ethyl trimethoxysilane, γ-glycidoxypropyl trimethoxysilane, γ-glycidoxypropyl methyl diethoxysilane, N-β-(aminoethyl)-γ-aminopropyl trimethoxysilane, N-β-(aminoethyl)-γ-aminopropyl methyl dimethoxysilane, γ-aminopropyl triethoxysilane, N-phenyl-γ-aminopropyl trimethoxysilane, γ-mercaptopropyl trimethoxysilane, and γ-chloropropyl trimethoxysilane.

The content of the silane coupling agent in the thermosetting epoxy resin composition is not particularly limited, may be appropriately selected depending on the intended purpose, and is preferably from 1 part by mass through 300 parts by mass and more preferably from 1 part by mass through 100 parts by mass relative to 100 parts by mass of the latent curing agent.

The thermosetting epoxy resin of the present invention is excellent in low-temperature curability and can be suppressed in viscosity rise during storage. Because viscosity rise during storage can be suppressed, it is possible to obtain a long working life (pot life) after blending and alleviate the burden of viscosity adjustment during use.

EXAMPLES

The present invention will be described below by way of Examples. However, the present invention should not be construed as being limited to these Examples.

Example 1

<Production of Latent Curing Agent>
<<Porous Particle Producing Step>>
—Preparation of Water Phase—

Distilled water (800 parts by mass), a surfactant (NEWREX R-T, available from NOF Corporation) (0.05 parts by mass), and polyvinyl alcohol as a dispersant (PVA-205, available from Kuraray Co., Ltd.) (4 parts by mass) were put in a 3 L interfacial polymerization container equipped with a thermometer and mixed uniformly, to prepare a water phase.

—Preparation of Oil Phase—

Next, a 24% by mass aluminum monoacetyl acetonate bis(ethyl acetoacetate) solution in isopropanol (ALUMICHELATE D, available from Kawaken Fine Chemicals Co., Ltd.) (80 parts by mass), an adduct of methylene diphenyl-4,4'-diisocyanate (3 moles) with trimethylolpropane (1 mole) (a multifunctional isocyanate compound, D-109, available from Mitsui Chemicals, Inc.) (80 parts by mass), and triphenyl silanol (TPS, available from Tokyo Chemical Industry Co., Ltd.) (80 parts by mass) were dissolved in ethyl acetate (120 parts by mass), to prepare an oil phase.

—Emulsification—

The prepared oil phase was fed into the water phase prepared beforehand, and mixed and emulsified with a homogenizer (10,000 rpm/5 minutes: T-50, available from IKA Japan K.), to obtain an emulsified liquid.

—Polymerization—

The prepared emulsified liquid was polymerized at 70 degrees C. for 6 hours under stirring at 200 rpm. After the reaction ended, the polymerization reaction liquid was left to cool to room temperature, and the produced polymerized resin particles were filtrated by filtration, washed by filtration in distilled water, and naturally dried at room temperature, to obtain a lumpy curing agent. This lumpy curing agent was pulverized to primary particles with a pulverizer (A-O JET MILL, available from Seishin Enterprise Co., Ltd.), to obtain a particulate curing agent.

—Additionally Filling Process—

The obtained particulate curing agent (15 parts by mass) was fed into an aluminum chelate-based solution [a solution obtained by dissolving an aluminum chelate agent (ALUMICHELATE D, available from Kawaken Fine Chemicals Co., Ltd.) (12.5 parts by mass) and another aluminum chelate agent (ALCH-TR, available from Kawaken Fine Chemicals Co., Ltd.) (25 parts by mass) in ethyl acetate (62.5 parts by mass)], and stirred at 80 degrees C. for 9 hours at a stirring speed of 200 rpm with ethyl acetate volatilized. After stirring was completed, the resultant was filtrated and washed with cyclohexane, to obtain a lumpy curing agent.

This lumpy curing agent was subjected to vacuum drying at 30 degrees C. for 4 hours, and subsequently pulverized to primary particles with a pulverizer (A-O JET MILL, available from Seishin Enterprise Co., Ltd.), to obtain a particulate curing agent (porous particles) (11 parts by mass) to which aluminum chelate agents were additionally filled. The amount of ethyl acetate in the filtrate was the amount reached when 90% of the initial amount was removed.

In this process, the amount of the particulate curing agent obtained was 11 parts by mass, which was less than the feeding amount of 15 parts by mass. The reason for this was considered to elution of triphenyl silanol in the curing agent into ethyl acetate. As a result, the sites of the curing agent from which triphenyl silanol was eluted (i.e., the sites capable of supporting an aluminum chelate) increased, and it was considered that the aluminum chelates were additionally filled into these sites.

<<Coating Step>>

The porous particles (25 parts by mass) obtained in the porous particle producing step were fed into a solution [a solution obtained by dissolving an alicyclic epoxy resin (CEL2000, available from Daicel Corporation) (180 parts by mass) in cyclohexane (120 parts by mass)](300 parts by mass), and stirred at 30 degrees C. for 20 hours at 200 rpm. During stirring, the alicyclic epoxy resin was polymerized and cured over the surface of the porous particles. As a result, a coating film formed of the cured product of the alicyclic epoxy resin was formed over the surface of the porous particles.

After stirring was completed, the resultant was filtrated and washed with cyclohexane, to obtain a lumpy curing agent. This lumpy curing agent was subjected to vacuum drying at 30 degrees C. for 4 hours, and subsequently pulverized to primary particles with a pulverizer (A-O JET MILL, available from Seishin Enterprise Co., Ltd.), to obtain a latent curing agent.

The content (concentration) of the alicyclic epoxy resin in the solution used in Example 1 was 60% by mass.

Example 2

<Production of Latent Curing Agent>

A latent curing agent was obtained in the same manner as in Example 1, except that unlike in the coating step of Example 1, the alicyclic epoxy resin (CEL2000, available from Daicel Corporation) was changed to an alicyclic epoxy resin (CEL3000, available from Daicel Corporation).

Example 3

<Production of Latent Curing Agent>

A latent curing agent was obtained in the same manner as in Example 1, except that unlike in the coating step of Example 1, the alicyclic epoxy resin (CEL2000, available from Daicel Corporation) was changed to an alicyclic epoxy resin (CEL2021P, available from Daicel Corporation).

Example 4

<Production of Latent Curing Agent>

A latent curing agent was obtained in the same manner as in Example 3, except that unlike in the coating step of Example 3, the solution was changed to a solution obtained by dissolving an alicyclic epoxy resin (CEL2021P, available from Daicel Corporation) (120 parts by mass) in cyclohexane (180 parts by mass).

The content (concentration) of the alicyclic epoxy resin in the solution used in Example 4 was 40% by mass.

Example 5

<Production of Latent Curing Agent>

A latent curing agent was obtained in Example 3, except that unlike in the coating step of Example 3, the solution was changed to a solution obtained by dissolving an alicyclic epoxy resin (CEL2021P, available from Daicel Corporation) (150 parts by mass) in cyclohexane (150 parts by mass).

The content (concentration) of the alicyclic epoxy resin in the solution used in Example 5 was 50% by mass.

Example 6

<Production of Latent Curing Agent>

A latent curing agent was obtained in the same manner as in Example 3, except that unlike in the coating step of Example 3, the solution was changed to a solution obtained by dissolving an alicyclic epoxy resin (CEL2021P, available from Daicel Corporation) (210 parts by mass) in cyclohexane (90 parts by mass).

The content (concentration) of the alicyclic epoxy resin in the solution used in Example 6 was 70% by mass.

Example 7

<Production of Latent Curing Agent>

A latent curing agent was obtained in the same manner as in Example 3, except that unlike in the coating step of Example 3, the solution was changed to a solution obtained by dissolving an alicyclic epoxy resin (CEL2021P, available from Daicel Corporation) (240 parts by mass) in cyclohexane (60 parts by mass).

The content (concentration) of the alicyclic epoxy resin in the solution used in Example 7 was 80% by mass.

Comparative Example 1

<Production of Latent Curing Agent>

The particulate curing agent (porous particles) to which aluminum chelates were additionally filled, obtained through the additionally filling process of the porous particle producing step of Example 1, was employed as a latent curing agent of Comparative Example 1.

(DSC Measurement)

The latent curing agents obtained in Examples 1 to 7 and Comparative Example 1 were subjected to DSC measurement.

<Preparation of Thermosetting Epoxy Resin Composition>

The following materials were mixed uniformly, to obtain a thermosetting epoxy resin composition for DSC measurement.

—Materials—
  Bisphenol A-type epoxy resin (EP828, available from Mitsubishi Chemical Corporation): 80 parts by mass
  Triphenyl silanol (available from Tokyo Chemical Industry Co., Ltd.): 8 parts by mass
  Latent curing agent: 4 parts by mass <Measuring Method>

Figure 1:
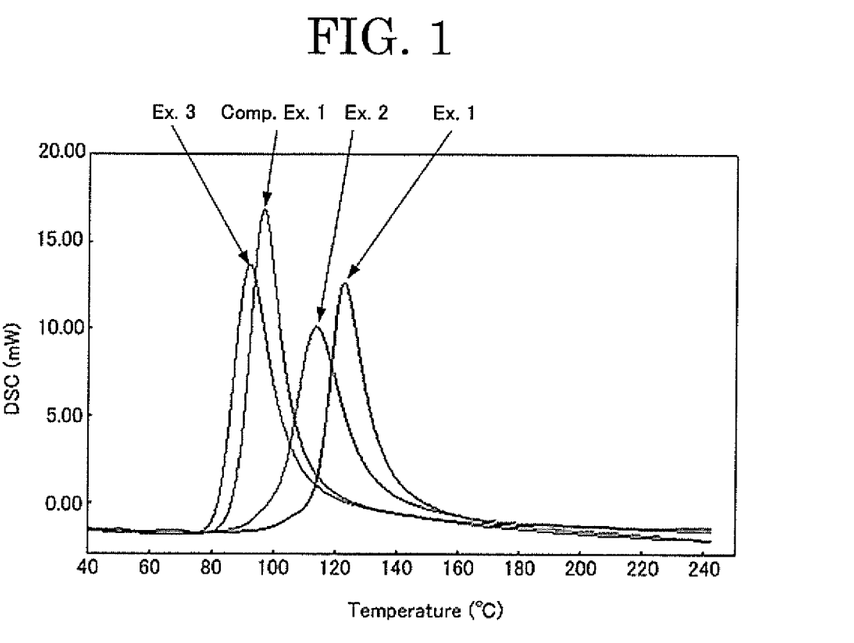
FIG. 1 plots the result of a DSC measurement.

The DSC measurement was performed under the measuring conditions described below. The results of Examples 1 to 3 and Comparative Example 1 are presented in Table 1 and FIG. 1. The results of Examples 3 to 7 are presented in Table 2.

—Measuring Conditions—
Measuring instrument: a differential thermal analyzer (DSC6200, available from Hitachi High-Tech Science Corporation)
Amount for evaluation: 5 mg
Temperature raising rate: 10 degrees C./1 min

TABLE 1

| Latent curing agent | Alicyclic epoxy resin | Exotherm start temperature (degree C.) | Exothermic peak temperature (degree C.) | Total exothermic amount (J/g) |
|---|---|---|---|---|
| Comp. Ex. 1 | — | 77.5 | 96.7 | −442 |
| Ex. 1 | CEL2000 | 94.7 | 122.8 | −386 |
| Ex. 2 | CEL3000 | 83.7 | 113.6 | −393 |
| Ex. 3 | CEL2021P | 74.8 | 92.0 | −440 |

The structures of the alicyclic epoxy resins were as presented below.

CEL2000

CEL3000

CEL2021P

Although the exotherm start temperature and the exothermic peak temperature varied among Examples 1 to 3, the low-temperature curing ability of Examples 1 to 3 was excellent compared with Comparative Example 1.

In the case of CEL2000 (Example 1) and CEL3000 (Example 2) that had one alicyclic epoxy structure in a molecule, the DSC exothermic peak temperature significantly shifted to a higher temperature side after the treatment.

On the other hand, when CEL2021P (Example 3), which was a bifunctional alicyclic epoxy compound, was used, it can be understood that the DSC exothermic peak temperature shifted oppositely to a lower temperature side than before the treatment.

TABLE 2

| Latent curing agent | Concentration of CEL2021P (% by mass) | Exotherm start temperature (degree C.) | Exothermic peak temperature (degree C.) | Total exothermic amount (J/g) |
|---|---|---|---|---|
| Ex. 4 | 40 | 68.5 | 94.7 | −426 |
| Ex. 5 | 50 | 74.3 | 92.5 | −410 |
| Ex. 3 | 60 | 74.8 | 92.0 | −440 |
| Ex. 6 | 70 | 74.1 | 93.1 | −437 |
| Ex. 7 | 80 | 78.7 | 88.7 | −421 |

Varying the concentration of the alicyclic epoxy resin in the solution used in the coating step did not make a significant difference in the DSC measurement results (charts) in terms of low-temperature curing ability. That is, Examples 4 to 7 also exhibited an excellent low-temperature curing ability like Example 3. Above all, in terms of the balance between the exotherm start temperature, which was the indicator of the low-temperature curing ability, and the exothermic peak temperature, an excellent content (concentration) of the alicyclic epoxy resin in the solution used in the coating step was from 50% by mass through 70% by mass.

(Viscosity Change During Storage)
Viscosity changes of thermosetting epoxy resin compositions produced using the latent curing agents of Example 3, Examples 5 to 7, and Comparative Example 1 were measured. A highly reactive alicyclic epoxy resin was used as the epoxy resin.
<Preparation of Thermosetting Epoxy Resin Composition>
A thermosetting epoxy resin composition for viscosity measurement was obtained by mixing the materials described below uniformly.
—Materials—
Alicyclic epoxy resin (CEL2021P, available from Daicel Corporation): 100 parts by mass
Triphenyl silanol (available from Tokyo Chemical Industry Co., Ltd.): 7 parts by mass
KBM403: 0.5 parts by mass
Latent curing agent: 2 parts by mass
KBM-403: available from Shin-Etsu Chemical Co., Ltd., 3-glycidoxypropyl trimethoxysilane
<Measuring Method>
Viscosity measurement was performed under the measuring conditions described below. The results are presented in Table 3.
—Measuring Conditions—
Measuring instrument: SV-10 (a vibration type viscometer available from A&D Co., Ltd.)
Aging temperature: room temperature (25 degrees C.)
Viscosity measuring temperature: 20 degrees C.

TABLE 3

| Latent curing agent | Concentration of CEL2021P (% by mass) | Initial viscosity (mPa·s) | 1 H viscosity (mPa·s) | 3 H viscosity (mPa·s) | 6 H viscosity (mPa·s) | 24 H viscosity (mPa·s) | 48 H viscosity (mPa·s) | Viscosity magnification (48 H value/initial value) |
|---|---|---|---|---|---|---|---|---|
| Comp. Ex. 1 | — | 524 | 594 | 686 | 808 | 3630 | Outside measurement range | — |
| Ex. 5 | 50 | 489 | 510 | 529 | 555 | 622 | 839 | 1.7 |
| Ex. 3 | 60 | 490 | 490 | 507 | 528 | 579 | 684 | 1.4 |
| Ex. 6 | 70 | 485 | 486 | 512 | 541 | 619 | 821 | 1.7 |
| Ex. 7 | 80 | 481 | 521 | 557 | 655 | 773 | Outside | — |

TABLE 3-continued

| Latent curing agent | Concentration of CEL2021P (% by mass) | Initial viscosity (mPa · s) | 1 H viscosity (mPa · s) | 3 H viscosity (mPa · s) | 6 H viscosity (mPa · s) | 24 H viscosity (mPa · s) | 48 H viscosity (mPa · s) | Viscosity magnification (48 H value/initial value) |
|---|---|---|---|---|---|---|---|---|
| | | | | | | | measurement range | |

In Table 3, "H" stands for "hour". That is, 1H stands for 1 hour. Therefore, for example, "1H viscosity" stands for the viscosity one hour later.

As compared with the thermosetting epoxy resin composition using the latent curing agent of Comparative Example 1, the thermosetting epoxy resin compositions using the latent curing agents of Example 3 and Examples 5 to 7 exhibited a good life as the liquids stored at room temperature, even when these thermosetting epoxy resin compositions used an alicyclic epoxy resin excellent in cationic polymerizability as the epoxy resin.

A better liquid life was exhibited when the concentration of the alicyclic epoxy resin in the solution used in the coating step was from 50% by mass through 70% by mass. The best liquid life was exhibited when the concentration was 60% by mass. Coatability of the porous particles with the coating film and the amount of the alicyclic epoxy resin unreacted were considered to have relation to these results.

The evaluation described above is about the latent curing agents with the coating film formed of CEL2021P. The latent curing agents with the coating film formed of any other alicyclic epoxy resin can also be expected to be effective for suppressing viscosity rise likewise.

(GC/Ms Measurement)

The coating films of the latent curing agents were analyzed by GC/MS measurement.

A liquid for measurement was produced by mixing the latent curing agent (10 parts by mass) and THF (tetrahydrofuran) (90 parts by mass). Using the obtained liquid for measurement, the coating film of the latent curing agent was analyzed with the instrument described below. The results are presented in Table 4.

—Analyzer—
HP6890N/5975 (available from Agilent Technologies, Inc.)

TABLE 4

| Latent curing agent | Area value of CEL2021P | CEL2021P (% by mass) |
|---|---|---|
| Comp. Ex. 1 | 0 | 0 |
| Ex. 3 | 18,893,352 | 0.68 |

It can be understood that an unreacted alicyclic epoxy resin was present in the coating film of the latent curing agent of Example 3.

(Particle Size Distribution and SEM Observation)

Figure 2:
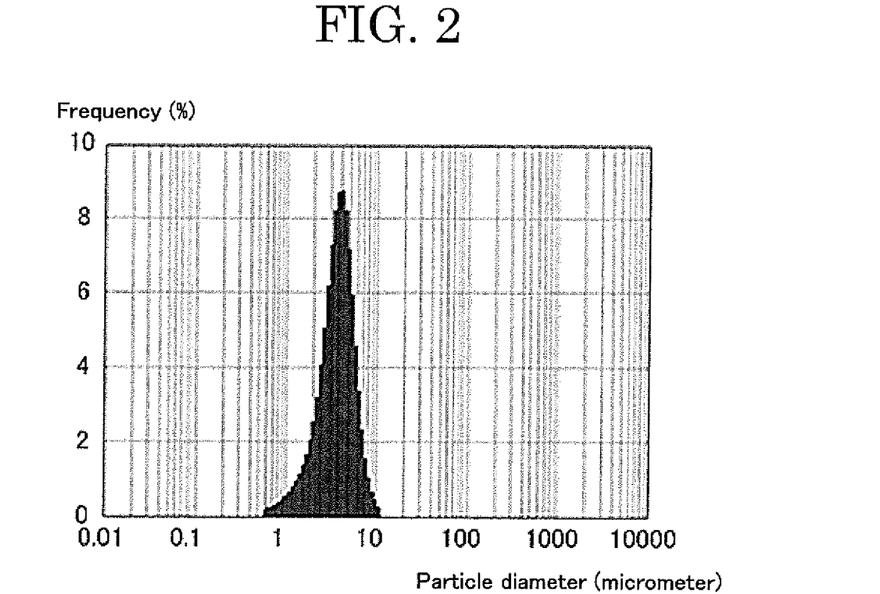
FIG. 2 plots the result of a measurement of a particle size distribution of a latent curing agent of Example 3.

The particle size distribution of the latent curing agent of Example 3 was measured with the instrument described below. The results are presented in FIG. 2 and Table 5.

Figure 3A:
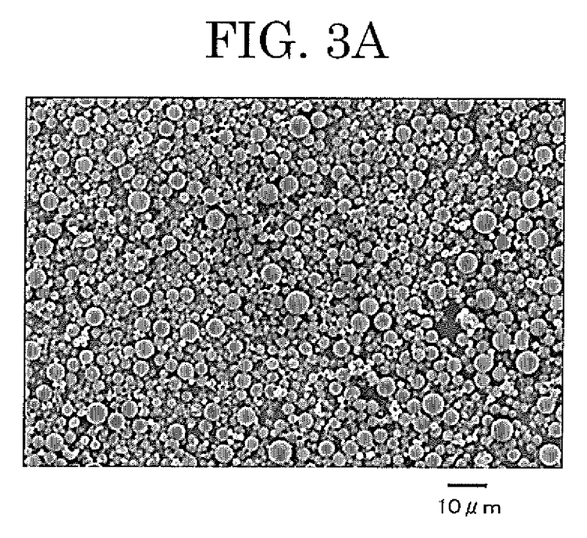
FIG. 3A is a SEM image of a latent curing agent of Example 3 (×1,000)
Figure 3B:
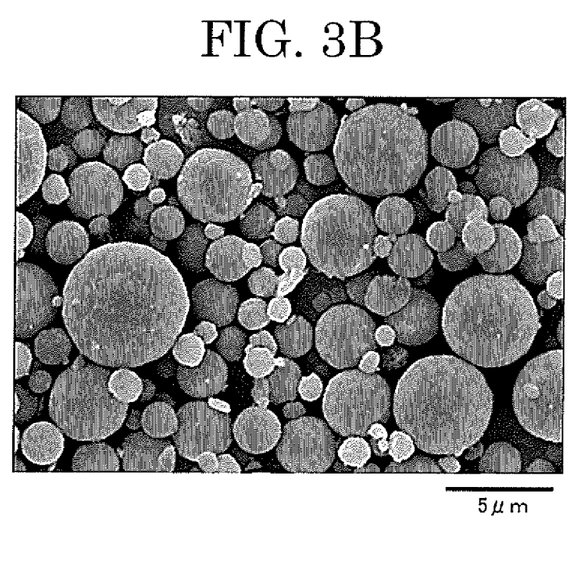
FIG. 3B is a SEM image of a latent curing agent of Example 3 (×5,000).

SEM (scanning electron microscopic) observation of the latent curing agent of Example 3 was also performed. The results are presented in FIG. 3A and FIG. 3B.

—Particle Size Distribution Measuring Instrument—
Laser-type particle size distribution measuring instrument: MT3300EXII (available from Nikkiso Co., Ltd.)

—SEM Observation—
JSM-6510A (available from JEOL Ltd.)

TABLE 5

| Latent curing agent | Average particle size (micrometer) | Maximum particle size (micrometer) | CV value (%) |
|---|---|---|---|
| Ex. 3 | 3.84 | 11 | 39.7 |

In Table 5, CV value is an indicator of the degree of variation of data and is calculated according to the formula described below.

$CV$=standard deviation/average value

It was possible to confirm that the latent curing agent of Example 3 did not undergo aggregation or shape change, and was obtained as good particles.

INDUSTRIAL APPLICABILITY

The latent curing agent of the present invention can be suitably used as a curing agent for thermosetting epoxy resin compositions, because the latent curing agent can satisfy both of a low-temperature curing ability and suppression of viscosity rise of the thermosetting epoxy resin compositions during storage.

The invention claimed is:

1. A latent curing agent, comprising:
porous particles formed of a polyurea resin and supporting an aluminum chelate and an aryl silanol compound; and
a coating film over a surface of the porous particles, the coating film being formed of a cured product of an alicyclic epoxy resin.

2. The latent curing agent according to claim 1,
wherein the alicyclic epoxy resin is vinyl cyclopentadiene dioxide, vinyl cyclohexene mono- or di-oxide, dicyclopentadiene oxide, epoxy-[epoxy-oxaspiro $C_{8-15}$ alkyl]-cyclo $C_{5-12}$ alkane, 3,4-epoxycyclohexylmethyl-3',4'-epoxycyclohexane carborate, epoxy $C_{5-12}$ cycloalkyl $C_{1-3}$ alkyl-epoxy $C_{5-12}$ cycloalkane carboxylate, or bis ($C_{1-3}$ alkyl epoxy $C_{5-12}$ cycloalkyl $C_{1-3}$ alkyl) dicarboxylate.

3. The latent curing agent according to claim 1,
wherein the alicyclic epoxy resin comprises at least any one of compounds represented by structural formulae below, 4. A method for producing a latent curing agent, the method comprising:
obtaining an emulsified liquid through emulsification of a liquid in which an aluminum chelate, an aryl silane compound, and a multifunctional isocyanate compound are mixed, and subsequently polymerizing the multifunctional isocyanate compound in the emulsified liquid, to obtain porous particles formed of a polyurea resin and supporting an aluminum chelate and the aryl silane compound or an aryl silanol compound, which is a hydrolysate of the aryl silane compound; and
coating a surface of the porous particles with a coating film formed of a cured product of an alicyclic epoxy resin.

5. The method for producing a latent curing agent according to claim 4,
wherein the coating is performed by immersing the porous particles in a solution containing the alicyclic epoxy resin and an organic solvent and curing the alicyclic epoxy resin.

6. The method for producing a latent curing agent according to claim 5,
wherein a content of the alicyclic epoxy resin in the solution is from 50% by mass through 70% by mass.

7. A thermosetting epoxy resin composition, comprising:
the latent curing agent according to claim 1; and
an epoxy resin.

8. The thermosetting epoxy resin composition according to claim 7, wherein the composition further comprises an aryl silanol compound.

9. The thermosetting epoxy resin composition according to claim 7
wherein the epoxy resin comprises an alicyclic epoxy resin.

* * * * *